(12) United States Patent
Gaul

(10) Patent No.: US 7,073,797 B2
(45) Date of Patent: Jul. 11, 2006

(54) TOOL HOLDER FOR ANNULAR CORE BIT

(75) Inventor: Hans-Dieter Gaul, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 288 days.

(21) Appl. No.: 10/723,773

(22) Filed: Nov. 26, 2003

(65) Prior Publication Data

US 2004/0154838 A1    Aug. 12, 2004

(30) Foreign Application Priority Data

Nov. 30, 2002   (DE)   ................ 102 56 043

(51) Int. Cl.
- B25G 3/22    (2006.01)
- B23B 31/08   (2006.01)
- B23B 5/34    (2006.01)
- E21B 10/02   (2006.01)

(52) U.S. Cl. .................. 279/8; 408/239 R; 403/359.3; 403/359.5; 175/403

(58) Field of Classification Search .............. 175/20, 175/244, 403; 125/3, 5, 20; 408/138, 239 R, 408/141, 142, 204; 279/7, 8; 403/298, 359.1, 403/359.3, 359.5
See application file for complete search history.

(56) References Cited

U.S. PATENT DOCUMENTS

| | | | | |
|---|---|---|---|---|
| 1,172,139 A * | 2/1916 | Jenkins | ........................ | 175/403 |
| 2,929,612 A * | 3/1960 | Le Bus, Sr. | ................ | 175/244 |
| 3,333,511 A * | 8/1967 | Schoepe | ...................... | 409/233 |
| 3,647,310 A * | 3/1972 | Morse | ..................... | 408/239 R |
| 3,715,168 A * | 2/1973 | Kuhn | .......................... | 408/204 |
| 3,876,319 A * | 4/1975 | Meyer | ......................... | 403/343 |
| 4,209,272 A * | 6/1980 | Miyanaga | ................... | 408/1 R |
| 4,303,357 A * | 12/1981 | Makar | ....................... | 408/204 |
| 4,860,838 A * | 8/1989 | Asak | .......................... | 175/320 |
| 5,004,382 A * | 4/1991 | Yoshino | ...................... | 408/68 |
| 5,163,523 A * | 11/1992 | Yousef et al. | ............... | 175/320 |
| 5,352,071 A * | 10/1994 | Cochran et al. | ............ | 408/204 |
| 5,393,175 A * | 2/1995 | Courville | ..................... | 408/56 |
| 5,655,613 A * | 8/1997 | Lauermann et al. | ......... | 175/403 |
| 6,092,964 A * | 7/2000 | El Dessouky et al. | ....... | 408/1 R |
| 6,341,925 B1 * | 1/2002 | Despres | ...................... | 408/204 |
| 6,588,993 B1 * | 7/2003 | Omi | ........................... | 408/226 |
| 6,887,018 B1 * | 5/2005 | Ostermeier | ................. | 408/204 |
| 2004/0018063 A1 * | 1/2004 | Ostermeier | ................. | 408/204 |
| 2005/0161263 A1 * | 7/2005 | Takano et al. | .............. | 175/403 |

* cited by examiner

Primary Examiner—Jennifer H. Gay
(74) Attorney, Agent, or Firm—Abelman, Frayne & Schwab

(57) ABSTRACT

A tool holder (1) and a shank (8) for quick mounting and dismounting an annular core bit (2) both include cooperating respective guide members (4, 4') provided at their bit-side ends, flanges (3, 9) arranged coaxially with the guide members (4, 4') for axially locking same and having, respectively, outer and inner threads, and outer and inner cone surfaces (6, 10) located inwardly of the respective guide members (4, 4') and axially spaced therefrom. The outer and inner cone surfaces (6, 10) taper toward their respective bit-side ends. The tool holder and the shank have cooperating torque transmitting elements (5, 5') arranged between the respective inner guide members (4, 4') and the respective outer cone surfaces (6, 10).

25 Claims, 2 Drawing Sheets

TOOL HOLDER FOR ANNULAR CORE BIT

BACKGROUND OF THE INVENTION

1. Field of the Invention

The present invention relates to a tool holder for a drilling tool and, in particular, for an annular core bit.

2. Description of the Prior Art

Tool holder for conventional annular core bits with an inner thread, e.g., 1¼" UNC or PIXIE, has a bit-side axial stop surface for axially supporting the core bit. A drawback of such releasable thread connections, e.g., according to U.S. Pat. No. 4,911,253, consists in laborious mounting of the core bit on the tool holder and its dismounting therefrom. Also, often, jamming of the thread connection occurs.

German Publication DE-37 44 091 discloses a tool holder for an annular core bit which permits quick mounting and dismounting of the core bit. The tool holder has an inner splined profile and two inner conical surfaces. The associated shanks of the annular core bits lead to an axial lengthening of the entire tool-holder-shank system.

U.S. Pat. No. 4,923,344 discloses a tool holder for quick mounting and dismounting an annular core bit having a special screw-in adapter with an outer thread provided at its bit-side end, and a short shank. The tool holder has a spline toothing for transmitting a torque, a hollow, freely rotatable flange with an inner thread for an axial locking, with coaxial displacement of the bit being effected exclusively via small axial annular end surfaces. Because of a relatively small distance between the annular end surfaces, the yield limits, which characterize a plastic deformation-free state, are also small. With annular core bits having large diameters, above 100 mm, the bending torques, which are generated during the use of the core bits, exceed those yield limits.

An object of the present invention is a tool holder for quick mounting and dismounting of annular core bit having a short shank and a large diameter.

Another object of the present invention is a shank for an annular core bit.

A further object of the present invention is to provide appropriate adapters for at least one of tool holders and shanks.

SUMMARY OF THE INVENTION

This and other objects of the present invention, which will become apparent hereinafter, are achieved by providing a tool holder having a guide member provided at a bit-side end of the tool holder, a hollow, freely rotatable flange arranged coaxially with the guide member for axially locking same and having an inner thread, an outer cone surface located inwardly of the guide member and axially spaced therefrom, the outer cone surface tapering toward the bit-side end of the tool holder, and torque transmitting means arranged between the guide member and the outer cone surface.

The provision of an outer cone surface spaced from the guide member permitted to provide a tool holder for quick mounting and dismounting of an annular core bit with a short shank, which is capable to withstand high bending torques without exceeding the yield limits of the guide member or the outer cone surface.

Advantageously, the guide member has an inner cylindrical surface. Thereby, with a circumferential even contact, an axial degree of freedom is obtained, which is useful during locking of the guide member.

Advantageously, the outer cone surface tapers toward the bit-side end of the tool holder at a cone angle from 10° to 15°, preferably, at a cone angle of 12.5°. This, in addition to providing a second even contact, insures a jam-free frictional locking.

Advantageously, an axial center of the guide member is spaced from an axial center of the outer cone surface by a distance amounting to from 25 mm to 50 mm, preferably by a distance of about 35 mm. With the diameter of the guide member of 24.5 mm and the mean diameter of the outer cone surface of 38 mm in the axial center of the outer cone surface, the obtained diagonal is maximized with respect to the bending torque.

Advantageously, the torsion transmitting means is formed as a channel toothing, which can be formed relatively easy, in particular, by extrusion.

Advantageously the inner thread of the flange is formed as a round thread, preferably as a left-hand round thread with a diameter of 55 mm. This permits to achieve a substantially soiling-free connection with a conventional bit subjected to a right-hand rotation.

Advantageously, the tool holder is formed as a hollow part. This provides for connection of the tool holder with a likewise hollow drive shaft through which a flushing fluid is fed into the interior of the annular core bit.

Advantageously, the tool holder is formed as an easily removable adapter, which permits it to be used in power tools with specific chucks.

Advantageously, the adapter has two, axially spaced, outer cone surfaces tapering inwardly from the bit-side end of the tool holder, and an axial spline shaft portion located between the outer cone surfaces. This permits to use the tool holder-adapter with standard chucks.

An annular core bit shank, which cooperates with the inventive tool holder, has a guide member provided at bit-side end of the shank a flange arranged coaxially with the guide member for axially locking same and having an outer thread, an inner cone surface located inwardly of the guide member and axially spaced therefrom, the inner cone surface tapering toward the bit-side end of the shank, and torque transmitting means arranged between the guide member and the inner cone surface.

Advantageously, the guide member has an inner cylindrical surface. Thereby, with a circumferential even contact, an axial degree of freedom is obtained, which is useful during locking of the guide member.

Advantageously, the inner cone surface tapers toward the bit-side end of the shank at a cone angle from 10° to 15°, preferably at a cone angle of 12.5°. This, in addition to providing a second even contact, insures a jam-free frictional locking.

Advantageously, an axial center of the guide member is spaced from an axial center of the inner cone surface by a distance amounting to from 25 mm to 50 mm, preferably, by a distance of about 35 mm. With the diameter of the guide member 24.5 mm and the means diameter of the inner cone surface of 38 mm in the axial center of the inner cone surface, the obtained diagonal is maximized with respect to the bending torque.

Advantageously, the torsion transmitting means is formed as a channel toothing, which can be formed relatively easy, in particular, by extrusion.

Advantageously the inner thread of the flange is formed as a round thread, preferably as a left-hand round thread with a diameter of 55 mm high looking forces. This permits to achieve high locking forces.

Advantageously, the shank is formed as a hollow part, which insures feeding of a flushing medium into the interior of the annular core bit.

Advantageously, the shank of the annular core bit is formed as a removable adapter, which makes it possible to use it with an annular core bit having a specific shank.

Advantageously, the adapter is provided with an outer thread, e.g., a M41×2 thread, which permits to use is with standard annular core bits.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
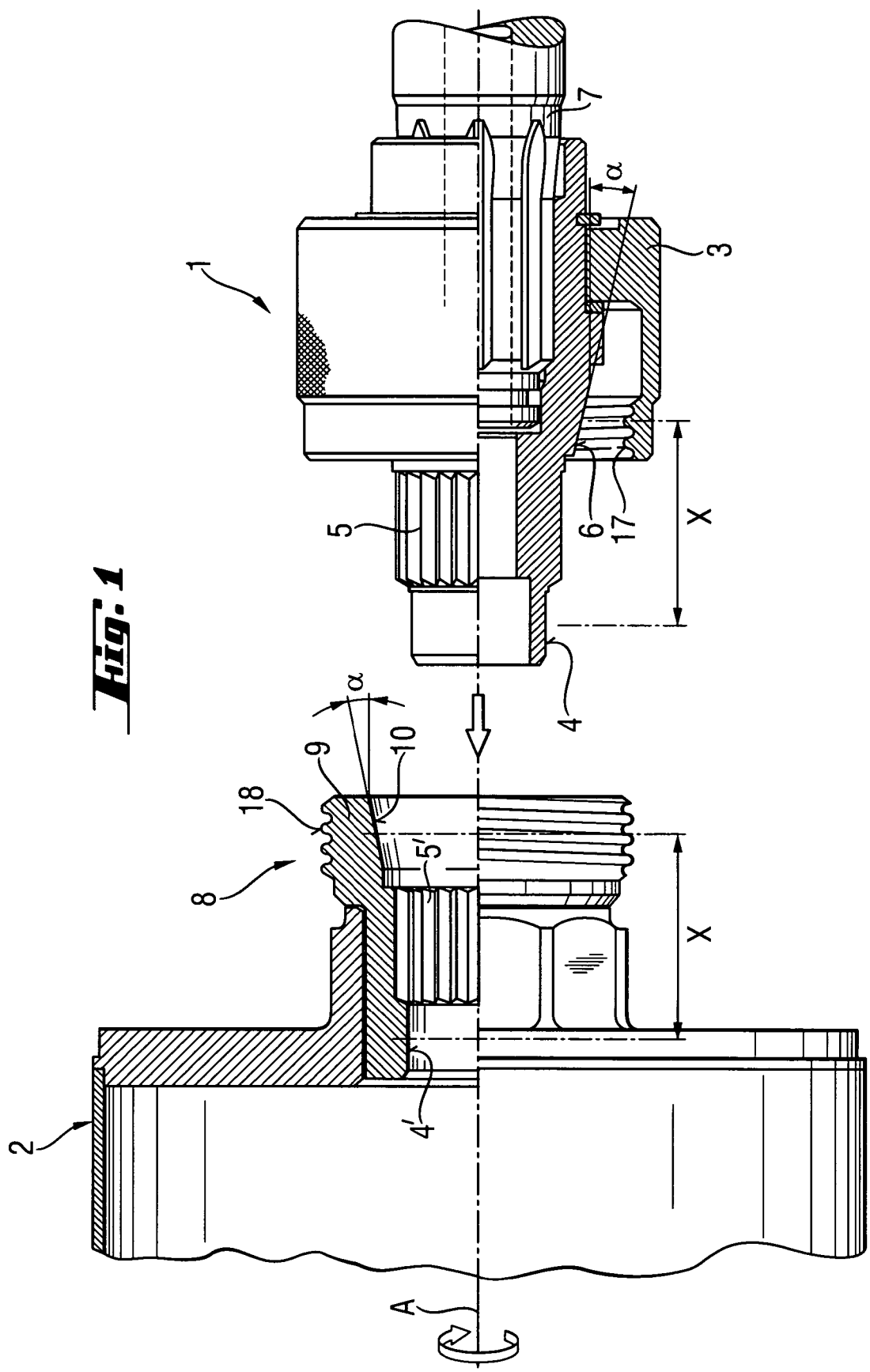
FIG. 1 a partially cross-sectional view of a system tool holder-shank of an annular core bit.

A tool holder 1 according to the present invention for quick mounting and dismounting of an annular core bit 2 and which is shown in FIG. 1, includes a hollow, freely rotatable flange 3 for axially locking, along an axis A a guide member 4 which is arranged at a bit-side end of the tool holder 1 coaxially with the flange 3 and has a cylindrical outer surface. The flange 3 has an inner thread 17 which is formed as a left-hand round thread. The tool holder 1 further includes an outer cone surface 6 axially spaced from the guide member 4 and tapering toward the bit-side end of the tool holder 1 at a cone angle α of from 10° to 15°, preferably, 12.5°, and torque transmitting means 5 which is arranged between the guide member 4 and the outer cone surface 6 and is formed as channel toothing. The tool holder 1, which is formed as a hollow member, has a female thread (not shown) with which is it mounted on a rotatable hollow drive shaft 7 for joint rotation therewith.

The tool holder is designed, as it has been mentioned above, for mounting the annular core bit 2 having a shank 8 that is formed as a hollow member and is soldered in the annular core bit 2. The shank 8, which is formed as a complementary to the tool holder 1, part, has a flange 9 with an outer thread and is designed for axially locking and locking of a guide element 4' provided at the bit-side end of the shank 8 and having an inner cylindrical surface. The shank 8 further includes an inner cone surface 10 axially spaced from the guide element 4' and tapering toward the bit-side end of the shank, and torque transmitting means 5' which is arranged between the guide element 4' and the inner cone surface 10 and is formed as channel toothing. The cone angle α amounts to from 10° to 15°, preferably 12.5°, and is equal to the cone angle of the outer cone surface 6 of the tool holder 1. The axial distance X between the axial center of the guide element 4' which has, e.g., a diameter of 24.5 mm, and the axial center of the inner cone surface 10 which is defined by a mean diameter of 38 mm, is equal to the axial distance between the axial center of the guide member 4 and the axial center of the outer cone surface 6 and amounts to 35 mm. The outer thread 18 of the flange 9 of the shank 8 is formed, as the inner thread 17 of the flange 3 of the tool holder 1, as a left-hand round thread and has a diameter, e.g., of 55 mm.

Figure 2:
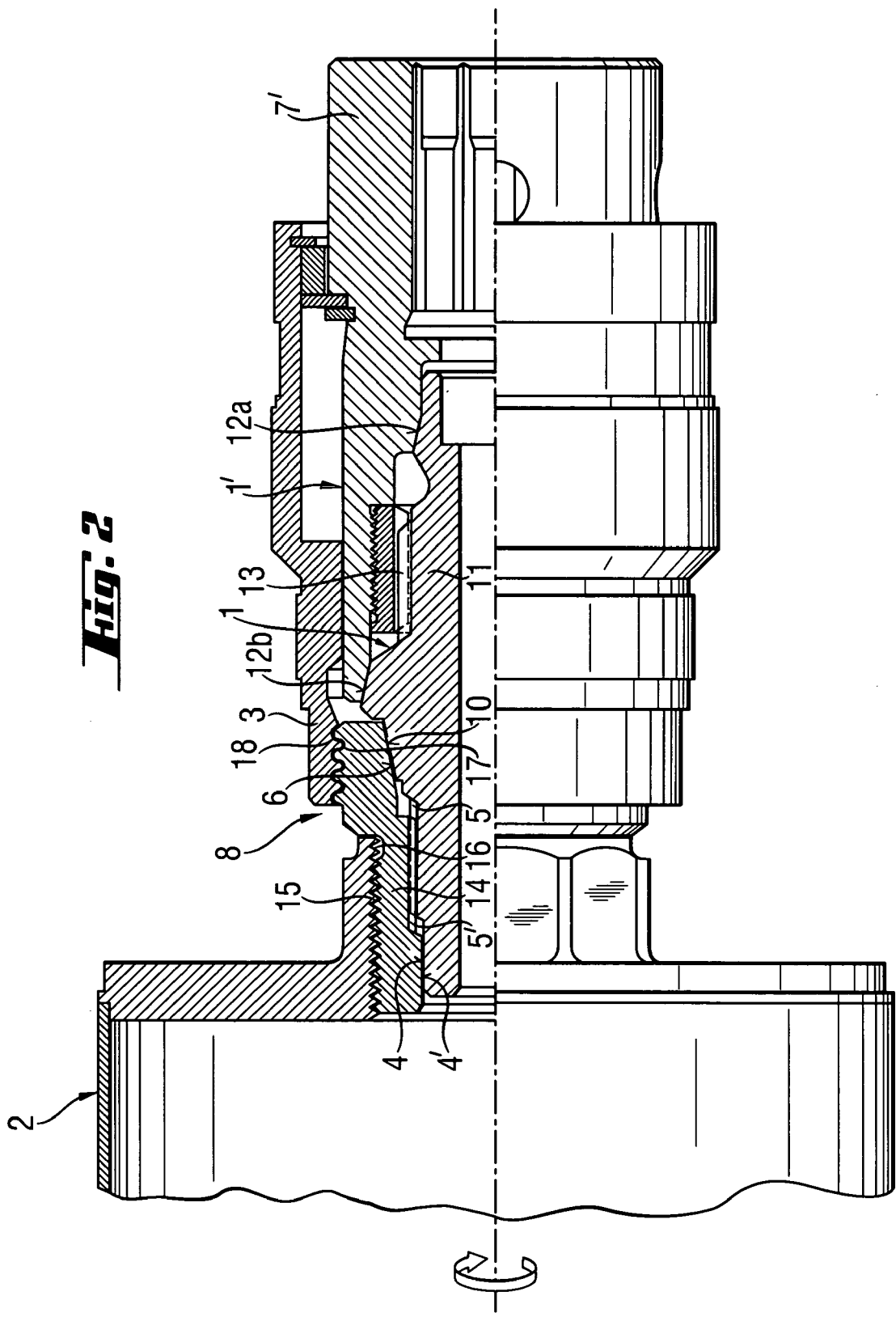
FIG. 2 a partially cross-sectional view of a system tool holder adapter-shank adapter.

As shown in FIG. 2, the tool holder 1 is formed as a specific tool holder adapter 11 that cooperates with a holding element 1' of a rotatable hollow drive shaft 7'. The tool holder adapter 11 has two, axially spaced from each other outer cone surfaces 12a, 12b tapering in a power tool-side direction, and an axially extending splined shaft portion 13 extending between the outer cone surfaces 12a and 12b.

The shank 8 can be formed as a shank adapter 14 provided, at its bit-side, with an outer thread 15, e.g. M41×2 thread, that cooperates with an inner thread 16, likewise M41×2 thread, of the annular core bit 2.

Though the present invention was shown and described with references to the preferred embodiment such are merely illustrative of the present invention and is not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A tool holder for quick mounting and dismounting an annular core bit (2), comprising a guide member (4) provided at a bit-side end of the tool holder (1); a hollow, freely rotatable flange (3) arranged coaxially with the guide member (4) for axially locking same and having an inner thread; an outer cone surface (6) located inwardly of the guide member (4) coaxially therewith and axially spaced therefrom, the outer cone surface (6) tapering toward the bit-side end of the tool holder (1) for guiding a core bit shank; and torque transmitting means (5) arranged between the guide member (4) and the outer cone surface (6).

2. A tool holder according to claim 1, wherein the guide member (4) comprises an outer cylindrical surface.

3. A tool holder according to claim 1, wherein the outer cone surface (6) tapers toward the bit-side end of the tool holder (1) at a cone angle (α) from 10° to 15°.

4. A tool holder according to claim 3, wherein the cone angle (α) amounts to 12.5°.

5. A tool holder according to claim 1, wherein an axial center of the guide member (4) is spaced from an axial center of the outer cone surface (6) by a distance (X) amounting to from 25 mm to 50 mm.

6. A tool holder according to claim 5, wherein the distance (X) between the axial centers of the guide member (4) and the outer cone surface (6) amounts to 35 mm.

7. A tool holder according to claim 1, wherein the torsion transmission means (5) is formed as channel toothing.

8. A tool holder according to claim 1, wherein the inner thread of the flange (3) is formed as a round thread (17).

9. A tool holder according to claim 8, wherein the inner thread is formed as a left-hand round thread having a diameter of 55 mm.

10. A tool holder according to claim 1, wherein the tool holder (1) is formed as a hollow part.

11. A shank of an annular core bit (2) adapted to be quick mounted on and dismounted from a tool holder, the shank (8) comprising a guide member (4') provided at a bit-side end of the shank (8); a flange (9) arranged coaxially with the guide member (4) for axially locking same and having an outer thread; an inner cone surface (10) located inwardly of the guide member (4') and axially spaced therefrom, the inner cone surface (10) tapering toward the bit-side end of the shank (8); and torque transmitting means (5') arranged between the guide member (4') and the inner cone surface (10).

12. A shank according to claim 11, wherein the guide member (4) comprises an inner cylindrical surface.

13. A shank according to claim 11, wherein the inner cone surface (10) tapers toward the bit-side end of the shank (8) at a cone angle (α) from 10° to 15°.

14. A shank according to claim 13, wherein the cone angle (α) amounts to 12.5°.

15. A shank according to claim 11, wherein an axial center of the guide member (4') is spaced from an axial center of the outer cone surface (1) by a distance (X) amounting to from 25 mm to 50 mm.

16. A shank according to claim 15, wherein the distance (X) between the axial centers of the guide member (4') and the outer cone surface (10) amounts to 35 mm.

17. A shank according to claim 11, wherein the torsion transmission means (5') is formed as inner channel toothing.

18. A shank according to claim 11, wherein the outer thread of the flange (9) is formed as a round thread (18).

19. A shank according to claim 18, wherein the outer thread is formed as a left-hand round thread having a diameter of 55 mm.

20. A shank according to claim 11, wherein the shank (8) is formed as a hollow part.

21. A shank according to claim 11, comprising an adapter (14).

22. A shank according to claim 21, wherein the adapter (14) is provided at bit-side end thereof with an outer thread (15).

23. A shank according to claim 22, wherein the thread (15) is a M41×2 thread.

24. A tool holder-shank system for quick mounting and dismounting an annular core bit (2), comprising a tool holder having a guide member (4) provided at bit-side end of the tool holder (1), a hollow freely rotatable flange (3) arranged coaxially with the guide member (4) for axially locking same and having an inner thread; an outer cone surface (6) located inwardly of the guide member (4) and axially spaced therefrom the outer cone surface (6) tapering toward the bit-side end of the tool holder (1) and torque transmitting means (5) arranged between the guide member (4) and the outer cone surface (6); and a shank connectable with the annular core bit and having a guide member (4') provided at a bit-side end of the shank (8) and cooperating with the guide member (4) of the tool holder (1), a flange (3) arranged coaxially with the guide member (4') for axially locking same and having an outer thread cooperating with the inner thread of the flange (3) of the tool holder (1), an inner cone surface (10) located inwardly of the guide member (4') and axially spaced therefrom, the inner cone surface (10) tapering toward the bit-side end of the shank (8) and cooperating with the outer cone surface (6) of the tool holder, and torque transmitting means (5') arranged between the guide member (4) and the inner cone surface (10) and cooperating with the torque transmitting means (5) of the tool holder (1).

25. A tool holder for quick mounting and dismounting an annular core bit (2), comprising a guide member (4) provided at a bit-side end of the tool holder (1); a hollow, freely rotatable flange (3) arranged coaxially with the guide member (4) for axially locking same and having an inner thread; an outer cone surface (6) located inwardly of the guide member (4) and axially spaced therefrom, the outer cone surface (6) tapering toward the bit-side end of the tool holder (1); torque transmitting means (5) arranged between the guide member (4) and the outer cone surface (6); and an adapter (11), wherein the adapter (11) has two, axially spaced, outer cone surfaces (12a, 12b) tapering inwardly from the bit-side end of the tool holder, and an axial spline shaft portion (13) located between the outer cone surfaces (12a, 12b).

* * * * *